United States Patent
Bae et al.

(10) Patent No.: US 7,791,999 B2
(45) Date of Patent: Sep. 7, 2010

(54) WRITING CONDITION OPTIMIZING METHOD AND APPARATUS, AND OPTICAL RECORDING MEDIUM

(75) Inventors: Jae-cheol Bae, Suwon-si (KR); In-oh Hwang, Seongnam-si (KR); Kyung-geun Lee, Seongnam-si (KR); Hui Zhao, Suwon-si (KR); Narutoshi Fukuzawa, Tokyo (JP); Takashi Kikukawa, Tokyo (JP); Tatsuhiro Kobayashi, Tokyo (JP)

(73) Assignee: TDK Corporation, Tokyo (JP)

( * ) Notice: Subject to any disclaimer, the term of this patent is extended or adjusted under 35 U.S.C. 154(b) by 928 days.

(21) Appl. No.: 11/641,065

(22) Filed: Dec. 19, 2006

(65) Prior Publication Data
US 2007/0177473 A1    Aug. 2, 2007

(30) Foreign Application Priority Data
Dec. 20, 2005    (KR)    ........... 10-2005-0126265

(51) Int. Cl.
G11B 7/00    (2006.01)
(52) U.S. Cl. ........... 369/47.53; 369/47.5; 369/53.27
(58) Field of Classification Search .......... 369/53.27, 369/47.53, 47.5
See application file for complete search history.

(56) References Cited

U.S. PATENT DOCUMENTS

| 5,418,770 | A | 5/1995 | Ide et al. | |
|---|---|---|---|---|
| 6,125,085 | A | 9/2000 | Fuji et al. | |
| 6,205,096 | B1 * | 3/2001 | Yeo et al. | 369/53.12 |
| 6,529,457 | B1 | 3/2003 | Narumi et al. | |
| 6,654,325 | B1 | 11/2003 | Minemura et al. | |
| 6,975,571 | B1 * | 12/2005 | Narumi et al. | 369/47.53 |
| 2004/0160874 | A1 | 8/2004 | Hwang et al. | |
| 2005/0147007 | A1 * | 7/2005 | Nakano et al. | 369/47.53 |
| 2005/0157620 | A1 * | 7/2005 | Narumi et al. | 369/47.53 |

FOREIGN PATENT DOCUMENTS

| EP | 1 365 392 A2 | 11/2003 |
|---|---|---|
| EP | 1 489 601 A1 | 12/2004 |
| EP | 1 603 127 A2 | 12/2005 |
| TW | I231488 | 4/2005 |

OTHER PUBLICATIONS

Search Report issued in PCT International Application No. PCT/KR2006/005587 on Mar. 30, 2007.
Written Opinion issued in PCT International Application No. PCT/KR2006/005587 on Mar. 30, 2007.
Supplemental Search Report issued in European Patent Application No. 06 835 294.7 dated Feb. 17, 2009.
Taiwanese Office Action dated Mar. 29, 2010, issued in corresponding Taiwanese Patent Application No. 95147895.

* cited by examiner

Primary Examiner—Wayne R Young
Assistant Examiner—Adam R Giesy
(74) Attorney, Agent, or Firm—Stein McEwen, LLP

(57) ABSTRACT

A method of optimizing a writing condition of an optical recording medium, including writing test pattern data with the writing condition on the optical recording medium, comparing an error pattern binary signal detected by reproducing the written test pattern data with a correct pattern binary signal of the test pattern data, and determining an optimum writing condition of the optical recording medium based on a result of the comparison.

8 Claims, 9 Drawing Sheets

TIME

TIME

TSFP : START FIRST PULSE
TEFP : END FIRST PULSE
TSMP : START MULTI PULSE
TEMP : END MULTI PULSE
TSLP : START LAST PULSE
TELP : END LAST PULSE
TLE : LAST ERASE

TELP DECREASE
(0.28T → 0.18T)

TELP INCREASE
(0.31T ⟶ 0.41T)

TSFP INCREASE
(0.25T → 0.35T)

WRITING CONDITION OPTIMIZING METHOD AND APPARATUS, AND OPTICAL RECORDING MEDIUM

CROSS-REFERENCE TO RELATED APPLICATION

This application claims the benefit of Korean Patent Application No. 2005-126265, filed on Dec. 20, 2005 in the Korean Intellectual Property Office, the disclosure of which is incorporated herein by reference.

BACKGROUND OF THE INVENTION

1. Field of the Invention

Aspects of the present invention relate to a method and apparatus to optimize a writing condition for an optical recording medium, and an optical recording medium therefore.

2. Description of the Related Art

A conventional writing condition optimizing method may include determining a write pulse having a minimum phase difference by extracting a phase difference between a writing pattern edge and a PLL (phase lock loop) clock edge as an error pulse during reproduction after writing is performed in a predetermined pattern, obtaining a condition in which the error pulse from an information table is minimized where the phase difference exists, according to a combination of a mark and a space, and repeating an operation of writing and reproducing a writing pattern with respect to a disk.

Another conventional writing condition optimizing method includes a method of optimizing writing by minimizing jitter. In this method, writing power is first optimized in an asymmetry correction method. Then, a writing pulse is determined by shifting a mark edge. That is, the first pulse and last pulse of the writing pulse is determined to minimize a jitter value.

These methods basically measure jitter using a zero-crossing method or optimize writing using the phase difference between the writing pattern edge and the PLL clock edge. However, as capacities of disks increase, use of the above and/or other methods become impossible.

FIGS. 1A and 1B are graphs respectively showing 25 GB and 50 GB RF signals measured using a pickup having a wavelength of 405 nm and NA of 0.85 in which a resolution is 119 nm (=405 nm/(4×0.85)). As shown in FIG. 1, for a 25 GB RF signal, the RF signal is clear so that the signal can be evaluated in the zero-crossing method and so that writing optimization is possible using the method. That is, since the RF signal is clearly crossing a zero point, as indicated by a circle A, the writing optimization is possible in the zero-crossing method.

As shown in FIG. 1B, for a 50 GB RF signal, since a signal less than a resolution (2 T=75 nm and 3 T=112.5 nm) cannot be detected, writing optimization cannot be achieved in the above-described conventional writing condition optimizing method. That is, since the RF signal does not cross the zero point in a portion indicated by a circle B, detection of the zero crossing of a writing RF signal is difficult.

This phenomenon is the same in a random signal of a Super-RENS disk including marks that are smaller than a resolution. In the Super-RENS disk, the size of a laser beam itself is not decreased but an optical characteristic changes in a partial area of the disk. Thus, since the length of a mark is decreased while the original size of the laser beam is unchanged, marks are positioned within a range of one spot of a laser beam and, thus, interfere with a signal. When the signal level of a particular mark is influenced by the signal levels of marks located before and after the particular mark due to the above-described inter-symbolic interference, the signal level of a mark or space becomes inconsistent even when the length of the mark or space is identical. Accordingly, the zero-crossing method cannot be used. Therefore, the writing optimizing method used for the conventional optical disk cannot be used for a Super-RENS disk, which includes marks smaller than a resolution. Thus, a new method is needed for the writing optimization.

SUMMARY OF THE INVENTION

To solve the above and/or other problems, aspects of the present invention provide a writing condition optimizing method and apparatus which improves the quality of a signal by optimumly determining a writing condition in a high density information recording medium, in particular, a super resolution disk, and an information storage medium therefor.

According to an aspect of the present invention, a method of optimizing a writing condition of an optical recording medium, including writing test pattern data with the writing condition on the optical recording medium, comparing an error pattern binary signal detected by reproducing the written test pattern data with a correct pattern binary signal of the test pattern data, and determining an optimum writing condition of the optical recording medium based on a result of the comparison.

The determining of the optimum writing condition comprises determining the writing condition of the written data as the optimum writing condition when the results of detection of the error pattern binary signal and the correct pattern binary signal are the same.

The determining of the optimum writing condition comprises writing data by changing the writing condition of the data until the results of detection of the error pattern binary signal and the correct pattern binary signal are the same when the results of detection of the error pattern binary signal and the correct pattern binary signal are not the same, and determining the writing condition of the written data as the optimum writing condition when the results of detection of the error pattern binary signal and the correct pattern binary signal are the same.

The determining of the optimum writing condition comprises comparing the error pattern binary signal with the correct pattern binary signal and, when a mark having a difference error repeatedly occurs, determining the mark and at least one mark and/or space before and after the mark as a writing improvement pattern, changing the writing condition of the data referring to the correct pattern binary signal, and writing data according to the writing improvement pattern, according to a changed writing condition.

In the changing of the writing condition, at least one of a width of a first writing pulse of the writing improvement pattern, a shift amount of a start point of the first writing pulse, and a width of a final writing pulse is changed referring to the correct pattern binary signal.

The changing of the writing condition comprises reading out information about the writing condition to be changed from a predetermined area of the optical recording medium.

According to another aspect of the present invention, an apparatus to optimize a writing condition of an optical recording medium comprises a reading and/or writing unit to write test pattern data to the optical recording medium with the writing condition and to read the test pattern data from the optical recording medium; and a control unit to compare an error pattern binary signal detected by a reproduction of the read test pattern data with a correct binary signal and to determine an optimum writing condition of the optical recording medium based on a result of the comparison.

According to another aspect of the present invention, an information storage medium where information about a writing condition adjustment value of the information storage medium is recorded and the information about a writing condition adjustment value comprises at least one of a width of a first writing pulse of a writing improvement pattern, a shift amount of a start point of the first writing pulse, and a width of a final writing pulse.

The information about a writing condition adjustment value is written in at least one of a lead-in area and a lead-out area of the information storage medium.

Additional and/or other aspects and advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1A:
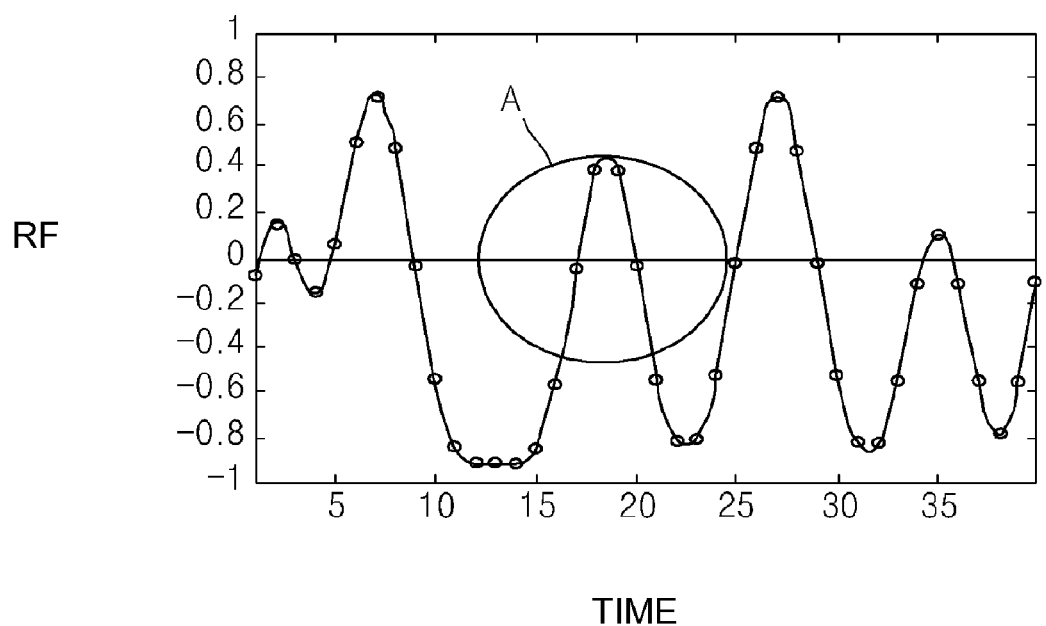
FIGS. 1A and 1B are graphs respectively showing 25 GB and 50 GB RF signals measured using a pickup having a wavelength of 405 nm and NA of 0.85 in which a resolution is 119 nm (=405 nm/(4×0.85))
Figure 1B:
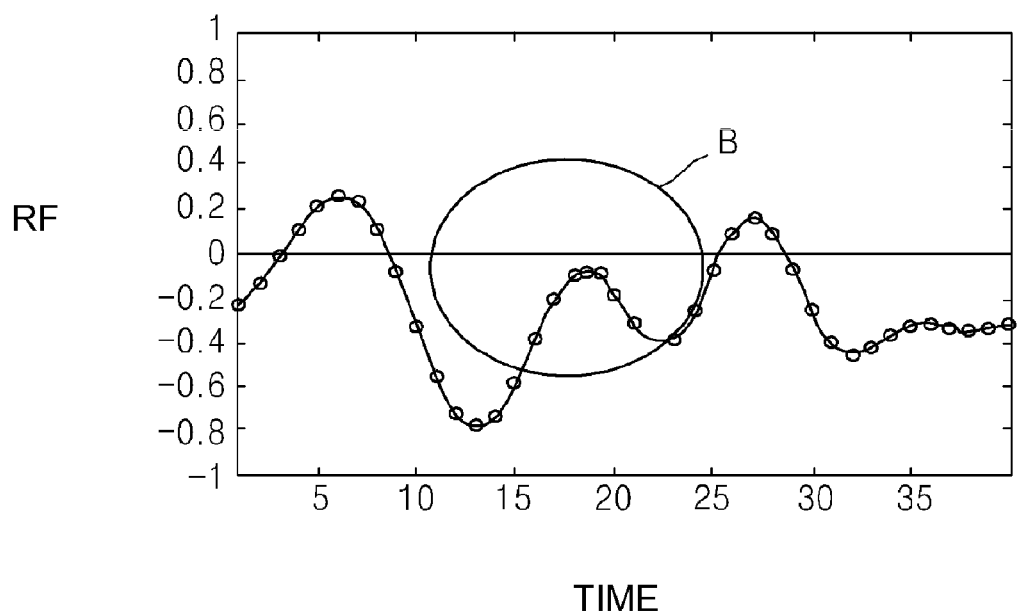

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
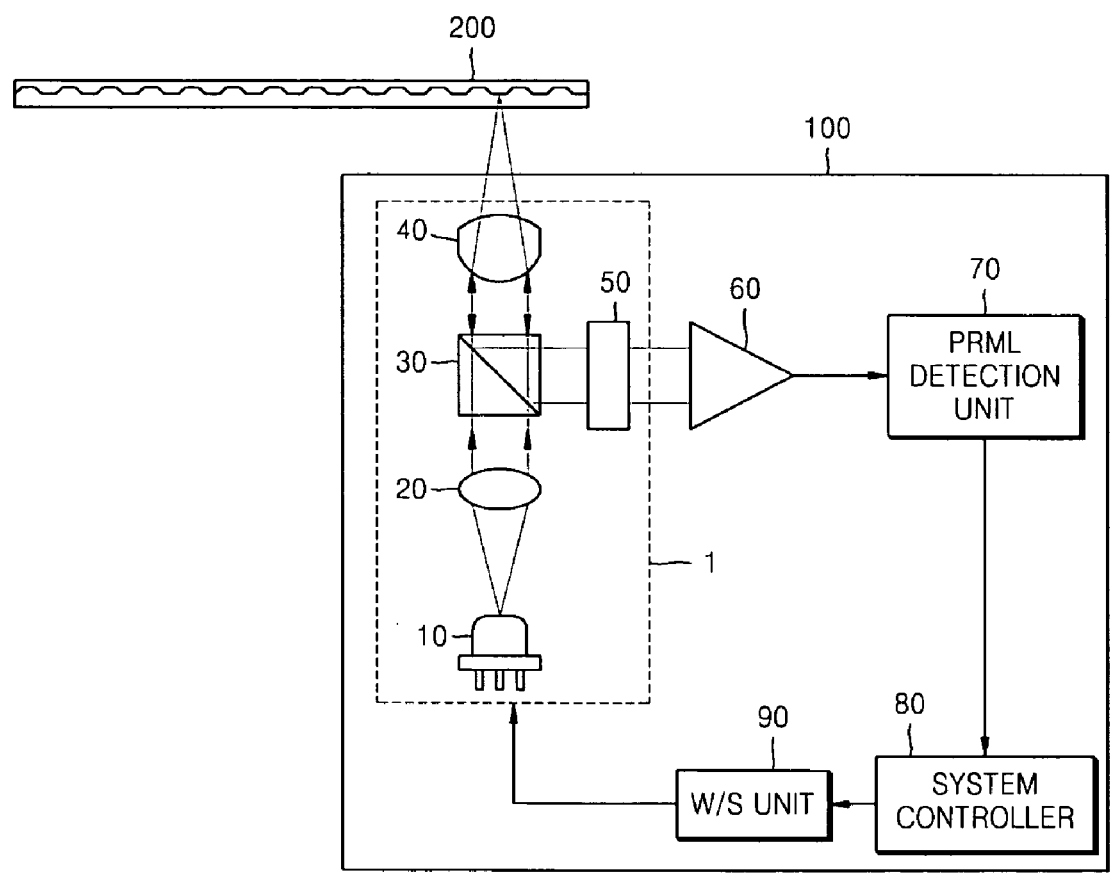
FIG. 2 is a view showing the configuration of a recording/reproducing apparatus according to an embodiment of the present invention.

Referring to FIG. 2, a recording/reproducing apparatus 100 according to an embodiment of the present invention includes a pickup unit 1, a partial response maximum likelihood (PRML) detection unit 70, a system controller 80, and a write strategy (W/S) unit 90. The W/S unit 90 provides the pickup unit 1 with a writing pattern and writing condition control signal according to the write strategy of the recording/reproducing apparatus 100. The pickup unit 1 emits light to an optical recording medium 200, which is a super resolution recording medium, according to the writing pattern and writing condition control signal received from the W/S unit 90.

The pickup unit 1 includes a laser diode 10 to emit light, a collimating lens 20 to convert the light emitted from the laser diode 10 to a parallel beam, a beam splitter 30 to change the proceeding path of incident light, and an objective lens 40 to focus the light passing through the beam splitter 30 onto the recording medium 200. The pickup unit 1 emits a reproduction beam towards the optical recording medium 200. The light reflected by the optical recording medium 200 is reflected by the beam splitter 30 and is received by a photodetector 50. A quadrature photodetector may be used as the photodetector 50. The light received by the photodetector 50 is then converted to an electric signal via a calculation circuit unit 60 and is output as an RF signal.

The PRML detection unit 70 receives the RF signal from the calculation circuit unit 60, converts the RF signal to a binary signal during a level detection method, and provides the converted binary signal to the system controller 80. As shown in FIG. 2, although the PRML detection unit 70 is used, the recording/reproducing apparatus 100 according to aspects of the present invention is not limited thereto and other binary signal detection methods may be used.

The system controller 80 controls the overall constituent elements of the recording/reproducing apparatus 100. In particular, the system controller 80 compares the binary signal received from the PRML detection unit 70 (hereinafter, referred to as "the error pattern binary signal") and the original binary signal of a writing pattern (hereinafter, referred to as "the correct pattern binary signal") and determines whether an error occurs and whether the generation of an error is repeated. The system controller 80 also determines whether a writing improvement mark exists where the repeated error occurs and whether at least one mark and one space exist before and after the writing improvement mark, as a writing improvement pattern. The system controller 80 also determines a set value of a writing pattern factor (a writing condition) to adjust the error pattern binary signal to be the same as the correct pattern binary signal and provides the set value of the writing pattern factor and the writing improvement pattern to the W/S unit 90. After performing the writing improvement pattern by adjusting the set value of the writing pattern factor, the system controller 80 determines the writing pattern factor used for the error pattern binary signal as an optimum writing pattern factor when the error pattern binary signal received from the PRML detection unit 70 and the correct pattern binary signal are the same.

Also, when adjusting the set value of the writing pattern factor, if information on the set value of the writing pattern factor is written in a predetermined area of the optical recording medium 200, the system controller 80 reads out the information on the set value of the writing pattern factor from the predetermined area so as to allow for an adjustment of the set value of the writing pattern factor using the information.

Figure 3:
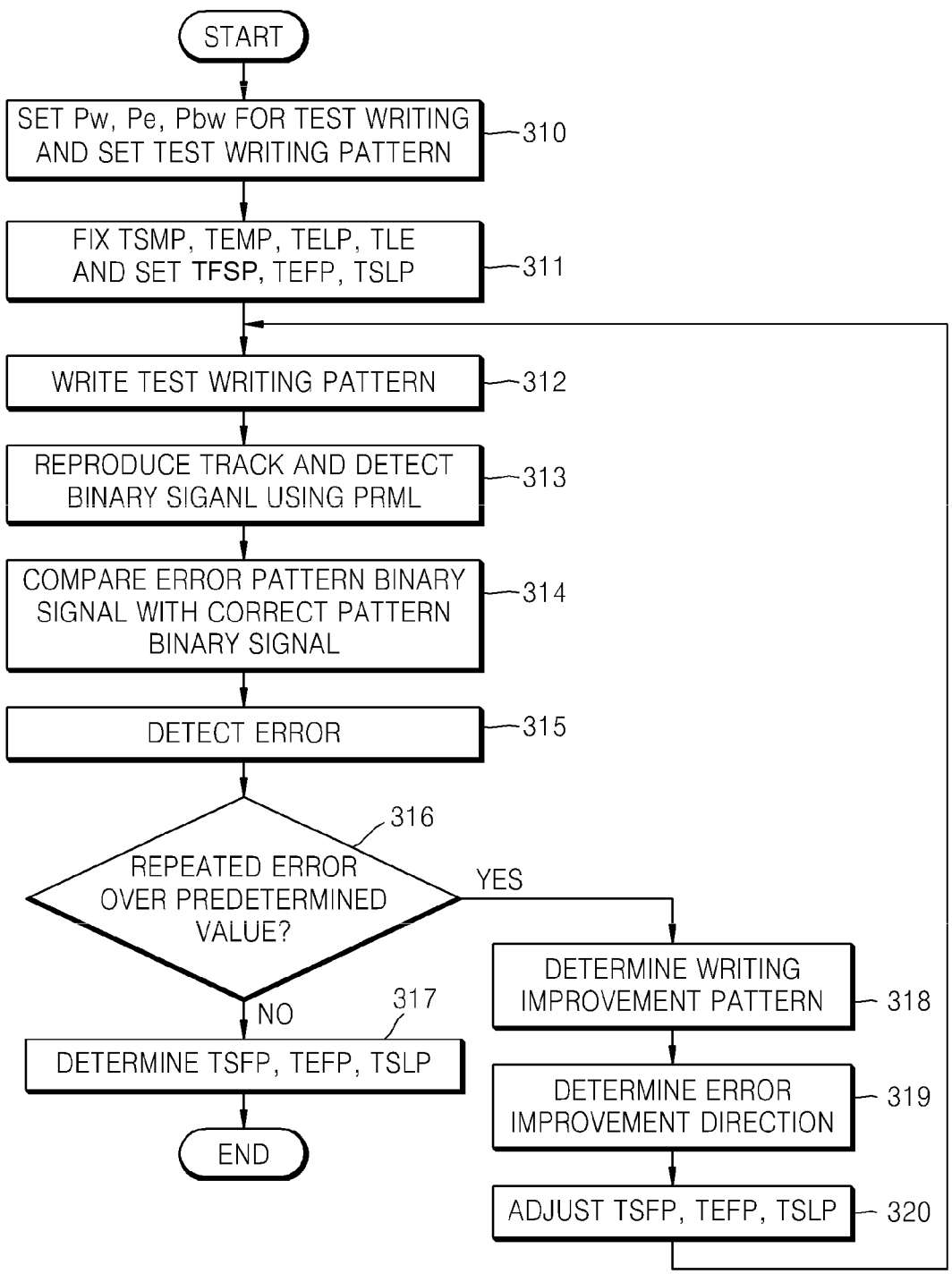
FIG. 3 is a flowchart for explaining a writing condition optimizing method according to an embodiment of the present invention.

FIG. 3 is a flowchart to explain a writing condition optimizing method according to an embodiment of the present invention. As shown in FIG. 3, a writing power level Pw, an erasure power level Pe, and a bias power level (or a bottom power level) Pbw for a test writing operation are set and a test writing pattern is set (310). The test writing pattern refers to a signal pattern in which a random signal appears repeatedly at a particular period.

Figure 4:
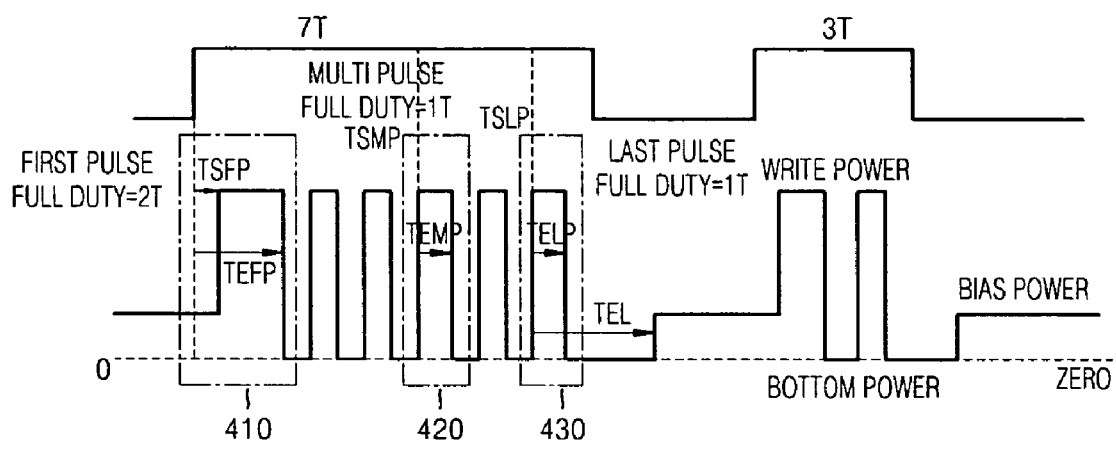
FIG. 4 is a timing diagram of a test writing pattern used for the writing condition optimizing method of FIG. 3.

FIG. 4 is a timing diagram of a test writing pattern used for the writing condition optimizing method of FIG. 3, showing the pattern of a pulse to write a 7 T mark and 3 T mark, respectively. The writing pulse shown in FIG. 4 corresponds to an (N−1) write strategy pattern. The (n−1) numbers of write pulses are used to write an nT mark. For example, a 7 T mark may include 6 write pulses and a first write pulse 410, a last pulse 430, and four multi pulses 420 interposed between the first and last write pulses 410 and 420. According to embodiments of the invention, the four multi pulses have similar characteristics.

The first write pulse 410 may move within a range of the first 2 T sections of 7 T. A start first pulse (TSFP) and an end first pulse (TEFP) respectively indicate the shift amount at a start point of the first write pulse 410 and the width of the first write pulse 410. Each of the multi pulses 420 may move within a range of assigned 1 T section. A start multi pulse (TSMP) and an end multi pulse (TEMP) respectively indicate the shift amount at a start point of the multi pulse 420 and the width of the multi pulse 420. The last write pulse 430 may move within a range of the last 1 T section. A start last pulse (TSLP) and an end last pulse (TELP) respectively indicate the shift amount at a start point of the last write pulse 430 and the width of the last write pulse 430. A last erase (TLE) indicates the width from the start point of the last write pulse to a point where the erasure power level starts.

The write conditions are determined by the conditions for the above write pulses. Although using the write strategy pattern, shown in FIG. 4, in the write condition optimizing method is possible according to aspects of the present invention, another type of the write strategy pattern may be used.

Referring back to FIG. 3, in the test writing pattern, while TSMP, TEMP, TELP, and TLE are fixed, TSFP, TEFP, and TSLP are set as variables (311). That is, TSFP, TEFP, and TSLP are write condition changing parameters according to an embodiment of the present invention.

Data is repeatedly written according to the test writing pattern based on the set value (312). After the test writing is completed, a test writing track is reproduced and the PRML detection unit 70 detects a binary signal, for example, NRZI format (313). Although the PRML detection unit 70 using level detection is used to detect a binary signal during the reproduction of data written to an optical recording medium according to aspects of the present embodiment, other binary signal detection methods (e.g., a slice detection method) may be used.

The PRML detection unit 70 compares the binary signal (hereinafter, referred to as "the error pattern binary signal") with the original binary signal of a writing pattern (hereinafter, referred to as "the correct pattern binary signal") (314), detects whether an error exists (315), and determines whether the error occurs over a predetermined value (316). For the error that is repeatedly generated over a predetermined value, the system controller 80 determines a writing improvement pattern (318) and an error improvement direction (319).

In detail, the PRML detection unit 70 detects the position of a mark where an error occurs. That is, the error occurs because the mark is detected as being too long or too short. In other embodiments, the error is found to occur either before or after the mark, and whether the error of the mark is determined as repeatedly occurring. When the error is determined to repeatedly occur over a predetermined value, the mark is determined to be a writing improvement mark.

The writing improvement mark and at least one mark and space before or after the mark are determined to be the writing improvement pattern. For example, the writing improvement pattern may be determined to include five symbols. That is, the writing improvement pattern may be mark-space-writing improvement mark-space-mark, in addition to the writing improvement mark.

The set values of TSFP, TEFP, and TSLP are adjusted to make the binary signal of the writing improvement pattern similar to the correct pattern binary signal (320). When the error repeatedly occurs over a predetermined value, operations 312 through 320 are repeated. When the repeated error over the predetermined value does not occur in operation 316, TSFP, TEFP, and TSLP, which are write conditions that are used for the present error pattern binary signal, are determined to be optimum write conditions (317).

Referring to FIGS. 5A through 7B, the writing condition optimizing method according to the present invention will be described below. The test conditions to obtain the result shown in FIGS. 5A through 7B are as follows.

A pickup having a wavelength of 405 nm, an NA of 0.85, and a resolution of 119 nm (=405 nm/(4×0.85)) is used to write a test writing pattern. The conditions of writing are a linear velocity of 2.5 m/sec, Pw of 10.8 mW, Pbais of 2.7 mW, Pr of 2.9 mW and mark lengths of 75 and 112.5 nm. An (N−1) write strategy pattern is used as a writing pulse which is described with reference to FIG. 4.

For a general optical disk using a 405 nm, NA 0.85 pickup, the length of the minimum mark is about 150 nm. However, in the super resolution optical disk, which is used for the present invention, the length of the minimum mark is 75 nm. This allows the super resolution optical disk to have twice the recording capacity of general recording media.

When a (1,7) code is used, if a length of 75 nm is set to 2 T, a length of 112.5 nm corresponds to 3 T. A reproduction signal identification method uses partial response maximum likelihood (PRML).

With respect to the present 25 GB Blu Ray Disk system, for optimum writing, an adaptive write strategy including three symbols, considering the front and rear spaces, is used. However, as the capacity increases, heat interference between marks to write increases and the number of marks and spaces entering in an optical spot increases, so that interference by light intensity increases. Thus, an adaptive write strategy considering more than 3 symbols is needed. Accordingly, considering the size of an optical spot and the length of the shortest mark, when the minimum mark is 75 nm, an adaptive write strategy considering 5 symbols is used. When the writing power and reproduction power are optimized (according to aspects of the present embodiment, the writing power and reproduction power are Pw of 10.8 mW, Pbais=2.7 mW, and Pr=2.9 mW), the system controller performs test writing for a writing pattern. In the present embodiment, a pattern signal in which a 2026-bit random signal repeats at a particular period is used.

In the present embodiment, the writing condition optimizing process is implemented according to the above writing condition optimizing method described with reference to FIG. 3. That is, after a writing pattern is set, TSMP, TEMP, TELP, and TLE are fixed and the writing pattern is written once by setting the writing pattern factors "TSFP, TEFP, and TSLP" as variables.

The writing pattern is reproduced and converted to a binary signal by the PRML detection unit 70. The binary signal (the error pattern binary signal) that is output from the PRML detection unit 70 is compared with the original binary signal (the correct pattern binary signal) of the writing pattern to detect a difference (i.e., an error). The mark where an error repeatedly occurs over a predetermined value is determined to be a writing improvement mark. The marks and spaces before and after the writing improvement mark are determined to be a writing improvement pattern (5 symbols).

The writing improvement pattern and adjusted values of the writing pattern factors "TSFP, TEFP, and TSLP" are output to the system controller 80. While the writing pattern factors "TSFP, TEFP, and TSLP" are changed within a predetermined range in the above method, the binary signal output from the PRML detection unit is compared with the original binary signal (the correct pattern binary signal) of the writing pattern. When the detected binary signal is the same, the optimum writing pattern factors "TSFP, TEFP, and TSLP" are determined.

Figure 5A:
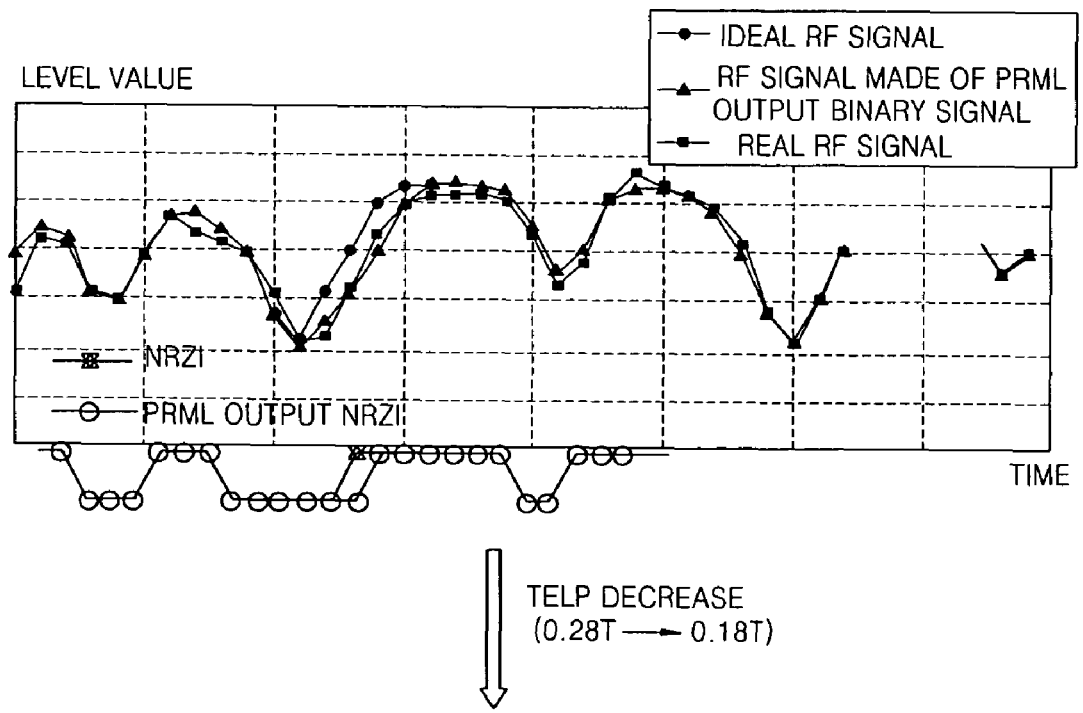
FIGS. 5A and 5B show an error improvement direction by the writing condition optimizing method of FIG. 3.
Figure 5B:
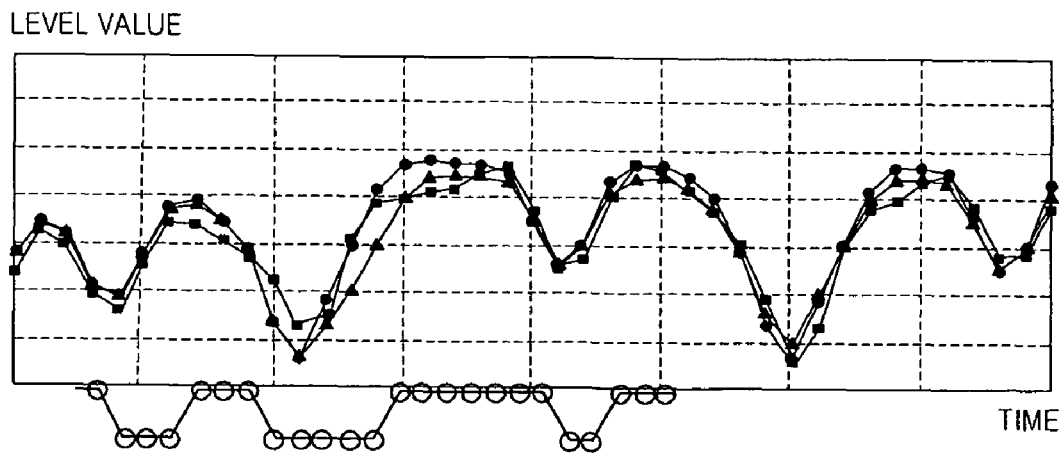

FIGS. 5A and 5B show an error improvement direction by the writing condition optimizing method of FIG. 3. In FIGS. 5A and 5B, the symbol "■" indicates a real radio frequency (RF) signal that is obtained by a reproduction of the test writing pattern, the symbol "●" indicates an ideal RF signal made of the writing pattern original binary signal, and the symbol "▲" indicates an RF signal made of the binary signal output from the RPML detection unit 70.

Referring to FIG. 5A, the original binary signal of the writing pattern (the correct pattern binary signal) is 00011100000111111100 (3 T mark—3 T space—5 T mark—7 T space—2 T mark) and the binary signal output from the PRML detection unit (the error pattern binary signal) is 00011100000011111100 (3 T mark—3 T space—6 T mark—6 T space—2 T mark). When the correct pattern binary signal is compared with the error pattern binary signal, an error occurs because the 5 T mark of the correct pattern binary signal is recognized as the 6 T mark in the error pattern binary signal and an error occurs in the later part of the mark. When this error is compared with the RF signal, it can be seen that the real RF signal ("■") is closer to the RF signal ("▲") made of the PRML output binary signal than the ideal RF signal ("●").

FIG. 5B shows the comparison of the correct pattern binary signal and the error pattern binary signal by adjusting the TELP of the 5 T mark when the error occurs by reducing the TELP of the 5 T mark from 0.28 T to 0.18 T and by writing the writing improvement pattern again. Referring to FIG. 5(b), it can be seen that the real RF signal ("■") is closer to the ideal RF signal ("●") than the RF signal ("▲") made of the PRML output binary signal before the reduction of duty. When the binary signals are compared with each other, it can be seen that the correct pattern binary signal matches the error pattern binary signal so that the 6 T mark and the 6 T space prior to the duty adjustment are detected as the 5 T mark and the 7 T space, respectively.

Figure 6A:
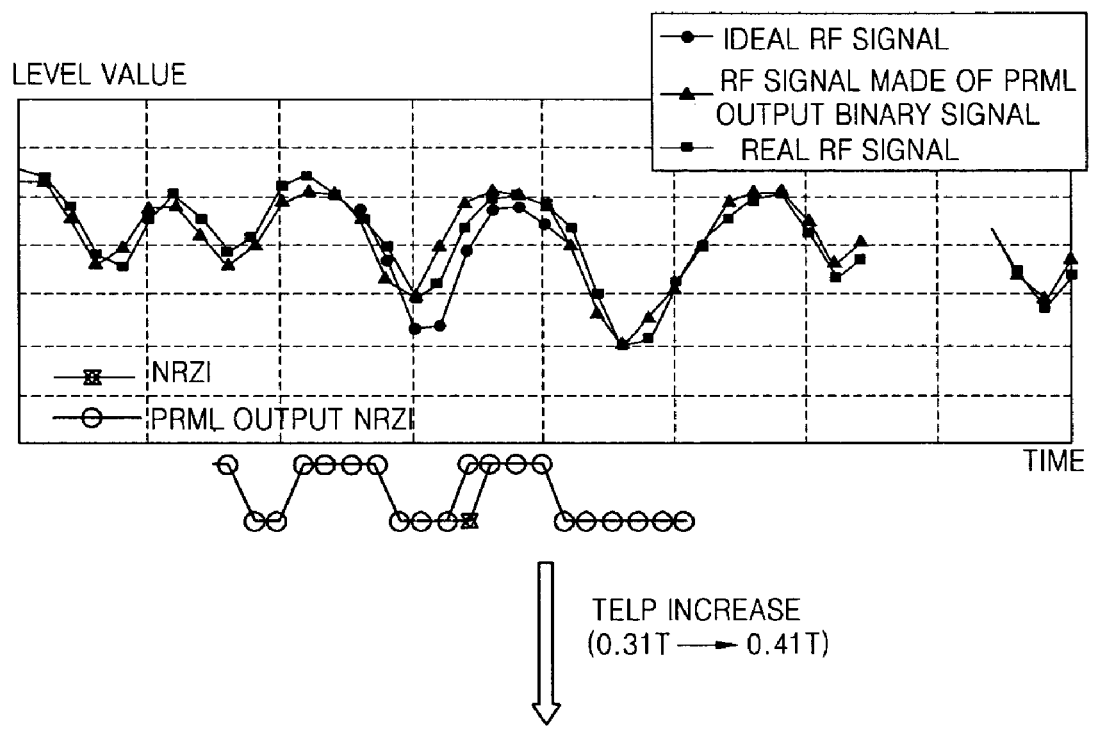
FIGS. 6A and 6B show another error improvement direction by the writing condition optimizing method of FIG. 3.
Figure 6B:
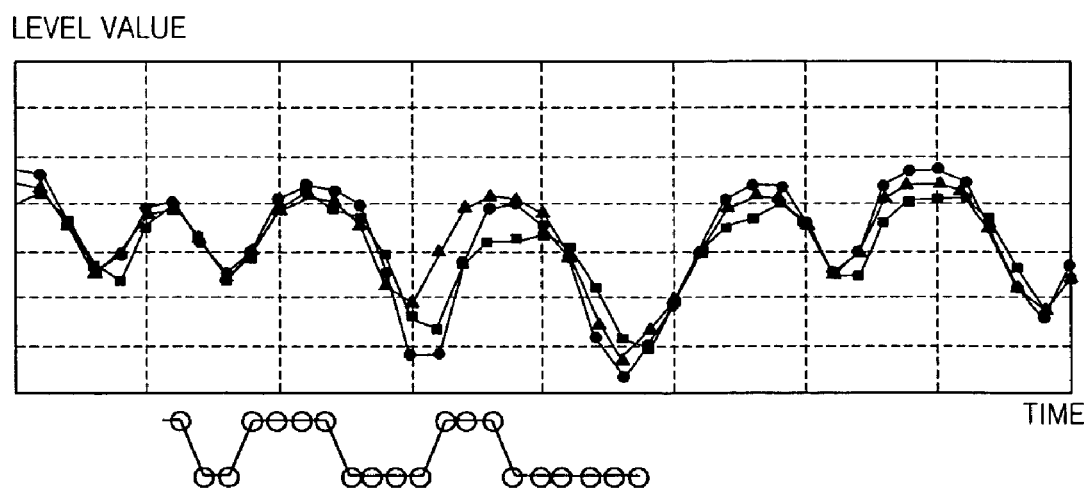

FIGS. 6A and 6B show another error improvement direction by the writing condition optimizing method of FIG. 3. The examples shown in FIGS. 6A and 6B oppose the example of FIG. 5. Referring to FIG. 6A, the original binary signal of the writing pattern (the correct pattern binary signal) is 00111100001110000000 (2 T mark—4 T space—4 T mark—3 T space—6 T mark) and the binary signal output from the PRML detection unit (the error pattern binary signal) is 00111110001111000000 (2 T mark—4 T space—3 T mark—4 T space—6 T mark). An error occurs because the 4 T mark of the correct pattern binary signal is recognized as the 3 T mark in the error pattern binary signal.

To improve the error, the correct pattern binary signal is compared with the error pattern binary signal by increasing the TELP of the 4 T mark from 0.31 T to 0.41 T and writing the writing improvement pattern again, which is shown in FIG. 6B. Referring to FIG. 6B, it can be seen that the real RF signal ("■") is closer to the ideal RF signal ("●") than the RF signal ("▲") made of the PRML output binary signal before the increase of duty. When the binary signals are compared with each other, the correct pattern binary signal matches the error pattern binary signal. Thus, it can be seen that the 4 T space is detected as the 4 T mark and the 3 T space by the duty adjustment.

Figure 7A:
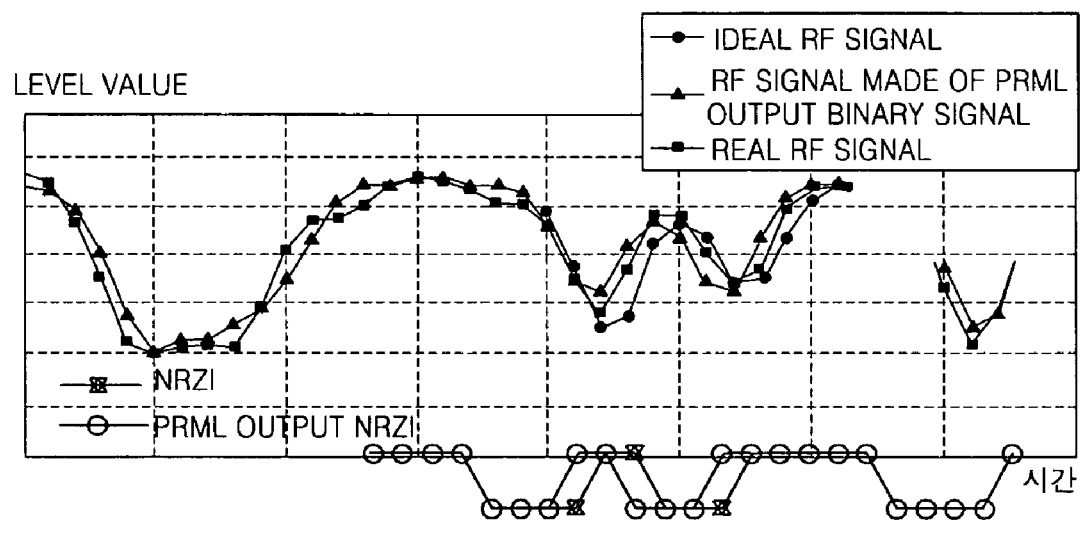
FIGS. 7A and 7B show another error improvement direction by the writing condition optimizing method of FIG. 3.
Figure 7B:
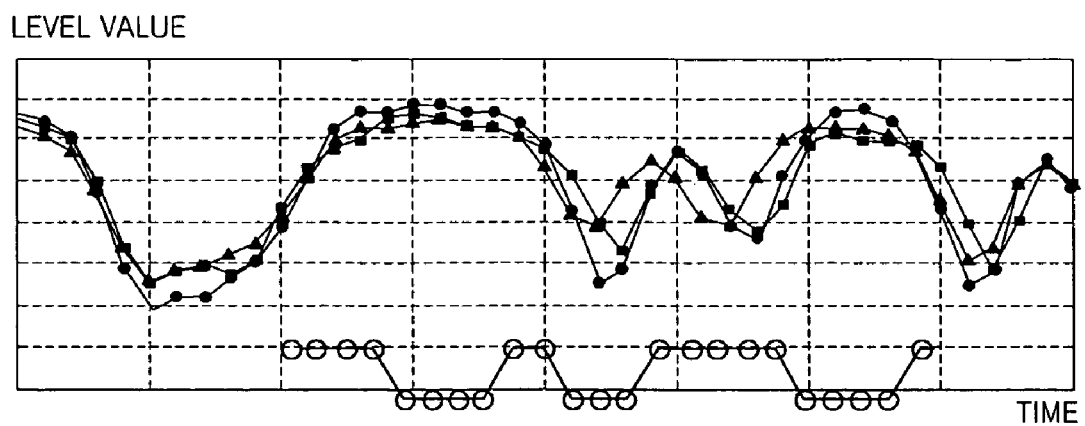

FIGS. 7A and 7B show another error improvement direction by the writing condition optimizing method of FIG. 3. Referring to FIG. 7A, the original binary signal of the writing pattern (the correct pattern binary signal) is 00001100011111110000 (4 T mark—2 T space—3 T mark—5 T space—4 T mark) and the binary signal output from the PRML detection unit (the error pattern binary signal) is 00011000111111110000 (3 T mark—2 T space—3 T mark—6 T space—4 T mark). An error occurs because the 3 T mark is shifted.

Thus, to improve the error, the correct pattern binary signal is compared with the error pattern binary signal by increasing the TSFP of the 3 T mark from 0.25 T to 0.35 T and writing the writing improvement pattern again, which is shown in FIG. 7B. Referring to FIG. 7B, it can be seen that the real RF signal ("■") is closer to the ideal RF signal ("●") than the RF signal ("▲") made of the PRML output binary signal before the increase of duty. When the binary signals are compared with each other, the correct pattern binary signal matches the error pattern binary signal. Thus, it can be seen that the 3 T mark, the 2 T space, the 3 T mark, and the 5 T space respectively are detected as the 4 T mark, the 2 T space, the 3 T mark, and the 5 T space by the duty adjustment.

Figure 8A:
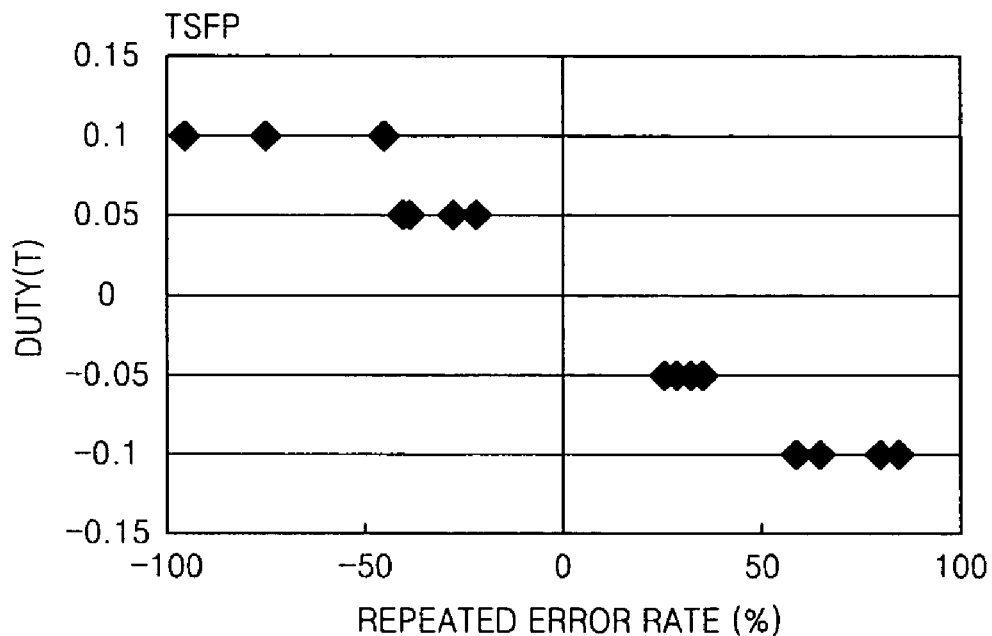
FIGS. 8A and 8B are graphs showing the change in the amount of duty according to a repeated error.
Figure 8B:
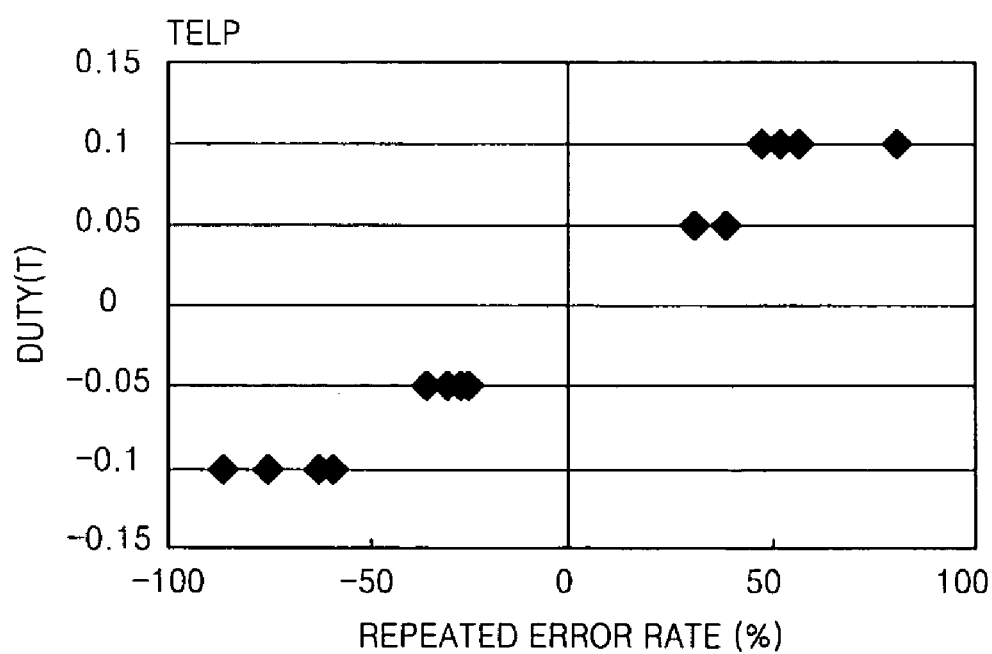

FIGS. 8A and 8B are graphs showing the change in the amount of duty according to a repeated error. Referring to FIG. 8A, when the repeated error rate is positive, a written mark is written to be shorter than the length of an ideal mark, that is, the binary signal output from the PRML detection unit 70 is greater than the original binary signal of the writing pattern. In this case, TSFP decreases duty. When the repeated error rate is negative, the written mark is written to be longer than the length of the ideal mark, that is, the binary signal output from the PRML detection unit 70 is smaller than the original binary signal of the writing pattern. In this case, TSFP increases duty. Referring to FIG. 8B, when the repeated error rate is positive, a written mark is written to be shorter than the length of the ideal mark, that is, the binary signal output from the PRML detection unit 70 is greater than the original binary signal of the writing pattern. In this case, TELP increases duty. When the repeated error rate is negative, the written mark is written to be longer than the length of the ideal mark, that is, the binary signal output from the PRML detection unit 70 is smaller than the original binary signal of the writing pattern. In this case, TELP decreases duty. For example, when the repeated error rate is not less than 50%, 0.1 T is increased or decreased. When the repeated error rate is less than 50%, 0.05 T is increased or decreased.

When the writing condition optimization is performed with respect to an optical recording medium prior to mass production of the optical recording medium and a duty amount to be adjusted by the repeated error rate is obtainable, the duty amount may be written in advance in a predetermined area of the optical recording medium during the manufacture of the optical recording medium. Thus, when the writing condition optimizing process is performed with respect to the optical recording medium having a predetermined area in which the duty amount to be adjusted by the repeated error rate is recorded, the time required to perform the writing condition optimization of the optical recoding medium may be reduced by an adjustment of the duty based on the information read from the predetermined area of the optical recording medium.

Figure 9:
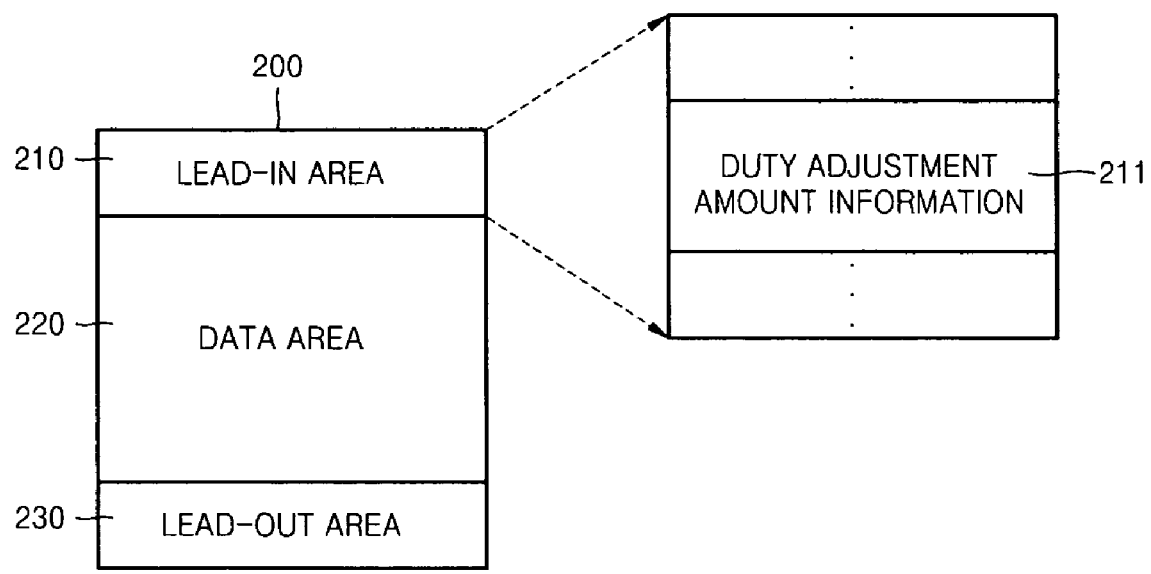
FIG. 9 is a view showing an information recording medium where the duty adjustment amount is written.

FIG. 9 is a view showing an information recording medium where the duty adjustment amount is written. As shown in FIG. 9, the optical recording medium 200 includes a lead-in area 210, a data area 220, and a lead-out area 230 which are sequentially arranged. Duty adjustment amount information 211 is recorded in the lead-in area 210. However, the duty adjustment amount information 211 is recordable, not only in the lead-in area 210, but also in the lead-out area 210 or in a predetermined position in the data area 220.

The above-described writing condition optimizing method according to aspects of the present invention may also be embodied as computer readable codes on a computer readable recording medium. The computer readable recording medium may be any data storage device that stores data which may be thereafter read by a computer system. Examples of the computer readable recording medium include read-only memory (ROM), random-access memory (RAM), CD-ROMs, magnetic tapes, floppy disks, and optical data storage device. The computer readable recording medium may also be distributed over network coupled computer systems so that the computer readable code is stored and executed in a distributed fashion. Also, functional programs, codes, and code segments for accomplishing aspects of the present invention may be easily construed by programmers skilled in the art to which the present invention pertains.

As is described above, according to aspects of the present invention, the writing condition may be effectively optimized for an optical recording medium of a high density information storage medium for which a zero-crossing detection method cannot be used. Also, a high capacity recording may be reproduced by improving the quality of a signal.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of optimizing a writing condition of a super resolution optical recording medium, comprising:
   repeatedly writing test pattern data comprising a multi pulse sequence with the writing condition on the super resolution optical recording medium for forming a mark thereon, the length of the minimum mark being smaller than a resolution;
   comparing an error pattern binary signal detected by reproducing the written test pattern data with a correct pattern binary signal of the test pattern data;
   determining an optimum writing condition of the optical recording medium based on a result of the comparison;
   wherein the determining of the optimum writing condition comprises:
     repeatedly writing the test pattern data and simultaneously changing the written condition until the error pattern binary signal and the correct pattern binary signal are the same when the error pattern binary signal and the correct pattern binary signal are initially different; and
     determining the writing condition to be the optimum writing condition when the error pattern binary signal and the correct pattern binary signal are the same;
   further wherein the repeatedly writing the test pattern data comprises:
     determining a mark and at least one mark and/or space before and after the mark as a writing improvement pattern, when the mark has a difference error repeatedly occurring when comparing the error pattern binary signal with the correct pattern binary signal;
     changing the writing condition of the test pattern data with reference to the correct pattern binary signal; and
     writing the test pattern data with the changed writing condition according to the writing improvement pattern.

2. The method according to claim 1, wherein the changing of the writing condition comprises changing at least one of a width of a first writing pulse of the writing improvement pattern, a shift amount of a start point of the first writing pulse, and a width of a final writing pulse.

3. The method according to claim 1, wherein the changing of the writing condition comprises reading out information about the writing condition to be changed from a predetermined area of the optical recording medium.

4. The method according to claim 1, wherein the changing of the writing condition comprises changing at least one of a width of a first writing pulse of the writing improvement pattern, a shift amount of a start point of the first writing pulse, and a width of a final writing pulse.

5. The method according to claim 1, wherein the changing of the writing condition comprises reading information about the writing condition to be changed from a predetermined area of the optical recording medium.

6. An apparatus to optimize a writing condition of a super resolution optical recording medium for forming a mark thereon, a length of a minimum mark being smaller than a resolution of the apparatus, the apparatus comprising:
   a reading and/or writing unit to write test pattern data comprising multi pulse sequence to the super resolution optical recording medium with the writing condition and to read the test pattern data from the super resolution optical recording medium; and
   a control unit to compare an error pattern binary signal detected by a reproduction of the read test pattern data with a correct binary signal and to determine an optimum writing condition of the super resolution optical recording medium based on a result of the comparison;
   wherein the control unit controls the reading and/or writing unit to write the test pattern data with a changed writing condition until the error pattern binary signal and the correct pattern binary signal are the same when the error pattern binary signal and the correct pattern binary signal are initially different, and determines that the writing condition of the written test pattern data is the optimum writing condition when the error pattern binary signal and the correct pattern binary signal are the same,
   further wherein the control unit determines a mark and at least one mark and/or space before and after the mark as being a writing improvement pattern, the mark having a difference error is repeatedly generated in comparing the error pattern binary signal with the correct pattern binary signal, changes the writing condition of the test pattern data referring to the correct pattern binary signal, and controls the reading and/or writing unit to write data with the changed writing condition according to the writing improvement pattern.

7. The apparatus according to claim 6, wherein the control unit changes the writing condition of the test pattern data by changing at least one of a width of a first writing pulse of the writing improvement pattern, a shift amount of a start point of the first writing pulse, and a width of a final writing pulse.

8. The apparatus according to claim 6, wherein the control unit controls the reading and/or writing unit to read out information about the writing condition to be changed from a predetermined area of the optical recording medium and changes the writing condition of the data according to the read information about the writing condition.

* * * * *